Jan. 7, 1969   C. W. PERKINS   3,421,073
VOLTAGE TAP CHANGING APPARATUS
Filed Oct. 7, 1966   Sheet 1 of 8

Chester W. Perkins,
Inventor.
Koenig, Senniger, Powers and Leavitt,
Attorneys.

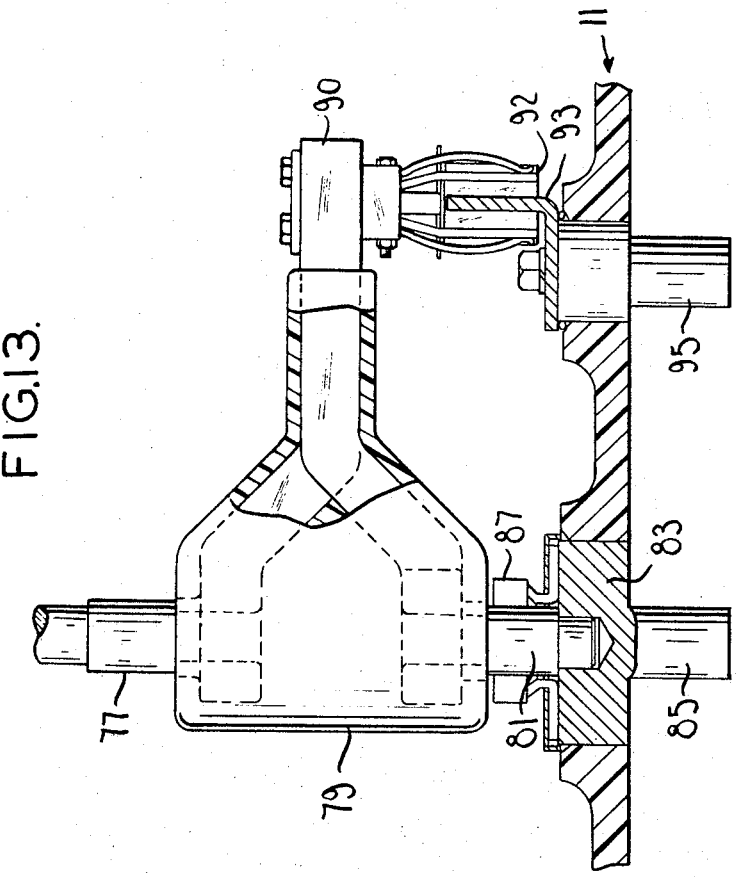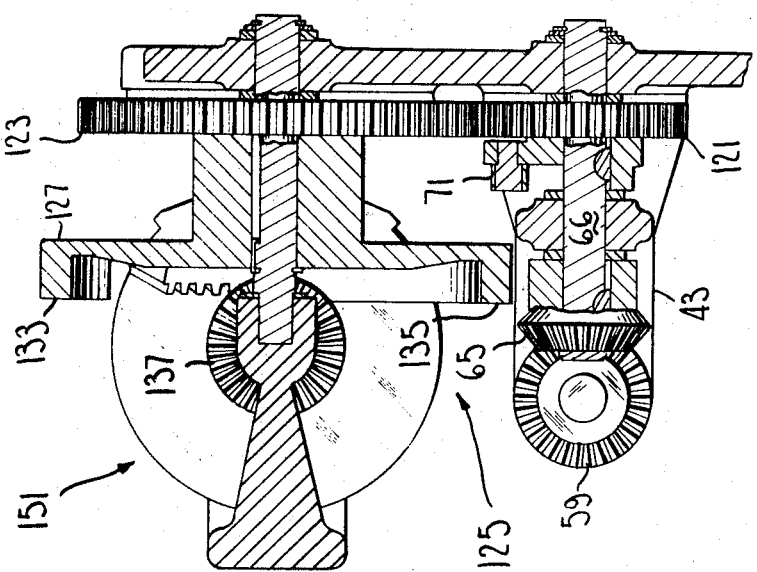

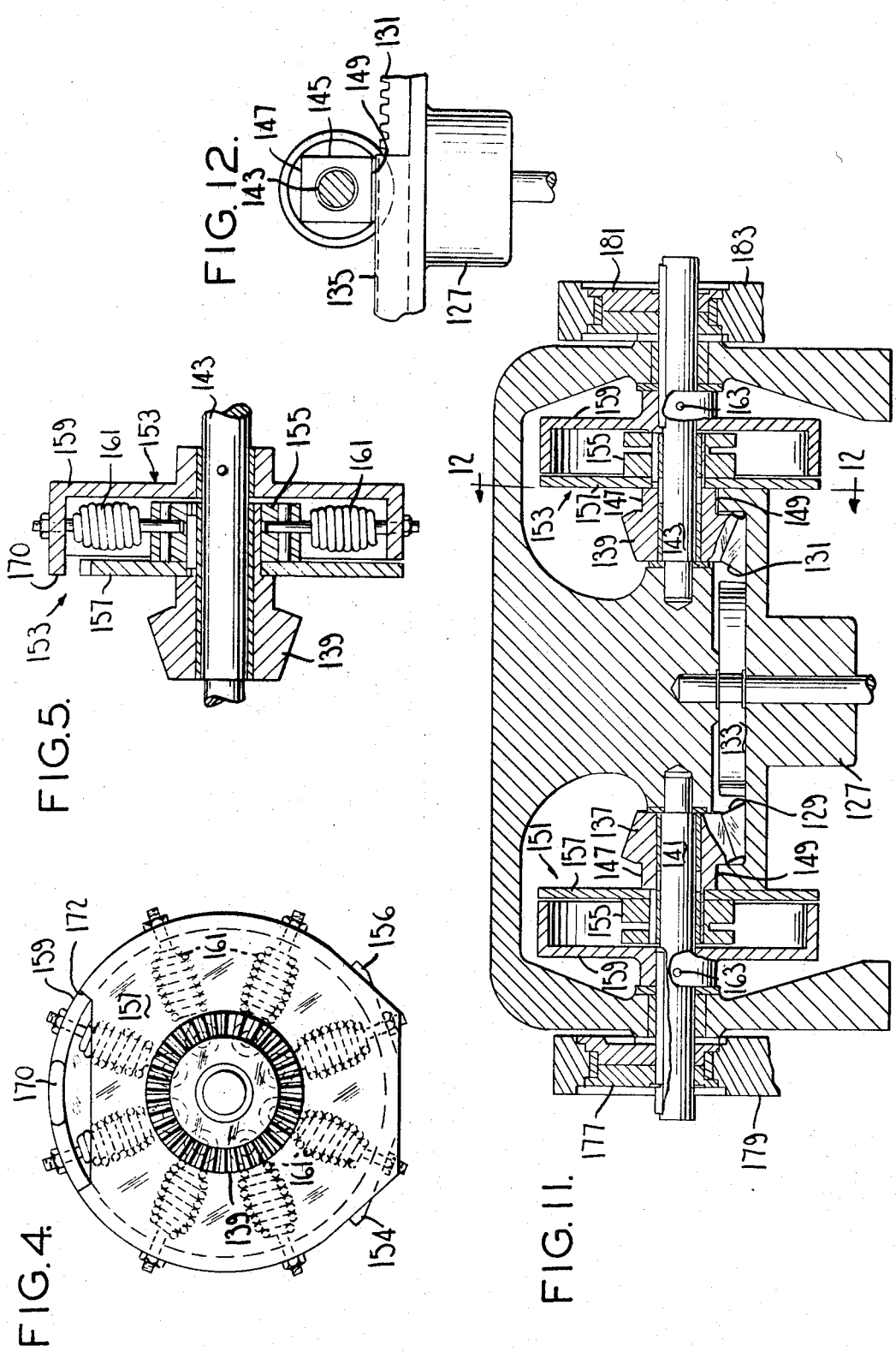

United States Patent Office 3,421,073
Patented Jan. 7, 1969

3,421,073
VOLTAGE TAP CHANGING APPARATUS
Chester W. Perkins, Armstrong Mills, Ohio, assignor to Central Transformer Corporation, Pine Bluff, Ark., a corporation of Arkansas
Filed Oct. 7, 1966, Ser. No. 585,028
U.S. Cl. 323—43.5                           19 Claims
Int. Cl. H02p 13/06; H02m 5/12

ABSTRACT OF THE DISCLOSURE

In the disclosed transformer voltage tap changing apparatus, a plurality of rotary tap changing switches are supported in generally coplanar relationship on an insulating bulkhead along with load transfer switches. All fixed contacts are mounted on feed-through terminals cast in the bulkhead and connections between the switches and corresponding transformer winding taps and inductor or impedance sections are made by flexible conductive cables at the back of the bulkhead. The load transfer switches are driven in proper sequential relationship with the operation of the tap changing switch through an intermittent motion drive including a large driving gear and a pair of smaller pinion gears which are coupled to the load transfer switches, the driving gear having teeth at spaced sectors around its periphery for causing the load transfer switches to be opened and closed during respective portions of its rotation.

This invention relates to apparatus for changing voltage tap connections and more particularly to such apparatus for changing such connections while under load.

Among the several objects of the present invention may be noted the provision of apparatus which will change voltage tap connections, e.g., to a power transformer, while those connections are under load; the provision of such apparatus in which the tap changing contacts do not break the load current; the provision of such apparatus in which the load current is broken by load transfer switches which are operated intermittently in predetermined sequential relationship with the operation of the tap changing contacts; the provision of an improved drive for producing such an intermittent operation; the provision of such apparatus in which the load transfer switches are operated rapidly to minimize arcing; the provision of such apparatus in which the tap changing and load transfer contacts are arranged in a generally planar configuration on an insulated bulkhead whereby all conductive cables for interconnecting the components are located behind the bulkhead; the provision of such apparatus in which terminals for establishing connections to the various contacts are cast in said bulkhead; the provision of such apparatus which is highly reliable; and the provision of such apparatus which is relatively simple and inexpensive. Other objects and features will be in part apparent and in part pointed out hereinafter.

Briefly, voltage tap changing apparatus of this invention includes a winding having a plurality of taps at which different voltages are provided and a rotary tap changing switch having a multiplicity of fixed contacts connected to respective ones of the taps and disposed in a circular pattern. The tap changing switch also includes a pair of rotatable contacts mounted on a common hub for movement into and out of engagement with selected ones of the fixed contacts, the hub having a first plurality of positions in which both of the rotatable contacts are in engagement with one of the fixed contacts and a second plurality of positions in which the rotatable contacts engage adjacent fixed contacts. An inductor is provided for bridging pairs of the taps. The inductor includes one winding section for connecting one of the taps to a load through one of the rotatable contacts and another section for connecting another of the taps to the load through the other of the rotatable contacts. First and second load transfer switches are provided for selectively disconnecting respective ones of the winding sections from the load and the load transfer switches are operated by respective rotary shafts. The shafts are rotated by an intermittent motion drive including a relatively large driving gear and a pair of smaller pinion gears connected to respective ones of the shafts. The driving gear has teeth at spaced sectors around its periphery for opening and closing one of the load transfer switches during one portion of its rotation and for opening and closing the other load transfer switch during another portion of its rotation, one of the load transfer switches being closed at all times. The driving gear is rotated in predetermined sequential relation to the rotation of the rotatable contacts whereby, as taps are changed, each of the inductor winding sections is disconnected from the load before the respective rotatable contact is moved out of engagement with one of the fixed contacts and is reconnected only after the rotatable contact engages another one of the fixed contacts.

In another aspect of this invention similar rotary tap changing switches and load transfer switches are provided for a plurality of electrical phases and are mounted generally in a common plane on one side of an insulating bulkhead cast of a stable insulating resin material. The switch contacts are mounted on terminals cast in the bulkhead or are connected to the terminals through frame members whereby all conductive cables for interconnecting the switches and various windings are located on the opposite side of the bulkhead, i.e., within the compartment for the windings.

The invention accordingly comprises the construction hereinafter described, the scope of the invention being indicated in the following claims.

In the accompanying drawings, in which several of various possible embodiments of the invention are illustrated:

FIGS. 4 and 5 are views illustrating the construction of an accelerator mechanism for producing rapid opening and closing of the load transfer switches;

FIG. 8 is a section substantially on line 8—8 of FIG. 6;

FIG. 11 is a section substantially on line 11—11 of FIG. 6;

FIG. 12 is a section substantially on line 12—12 of FIG. 11;

FIG. 13 is a view illustrating the contacts of a rotary tap changing switch;

Corresponding reference characters indicate corresponding parts throughout the several views of the drawings.

Figure 1:
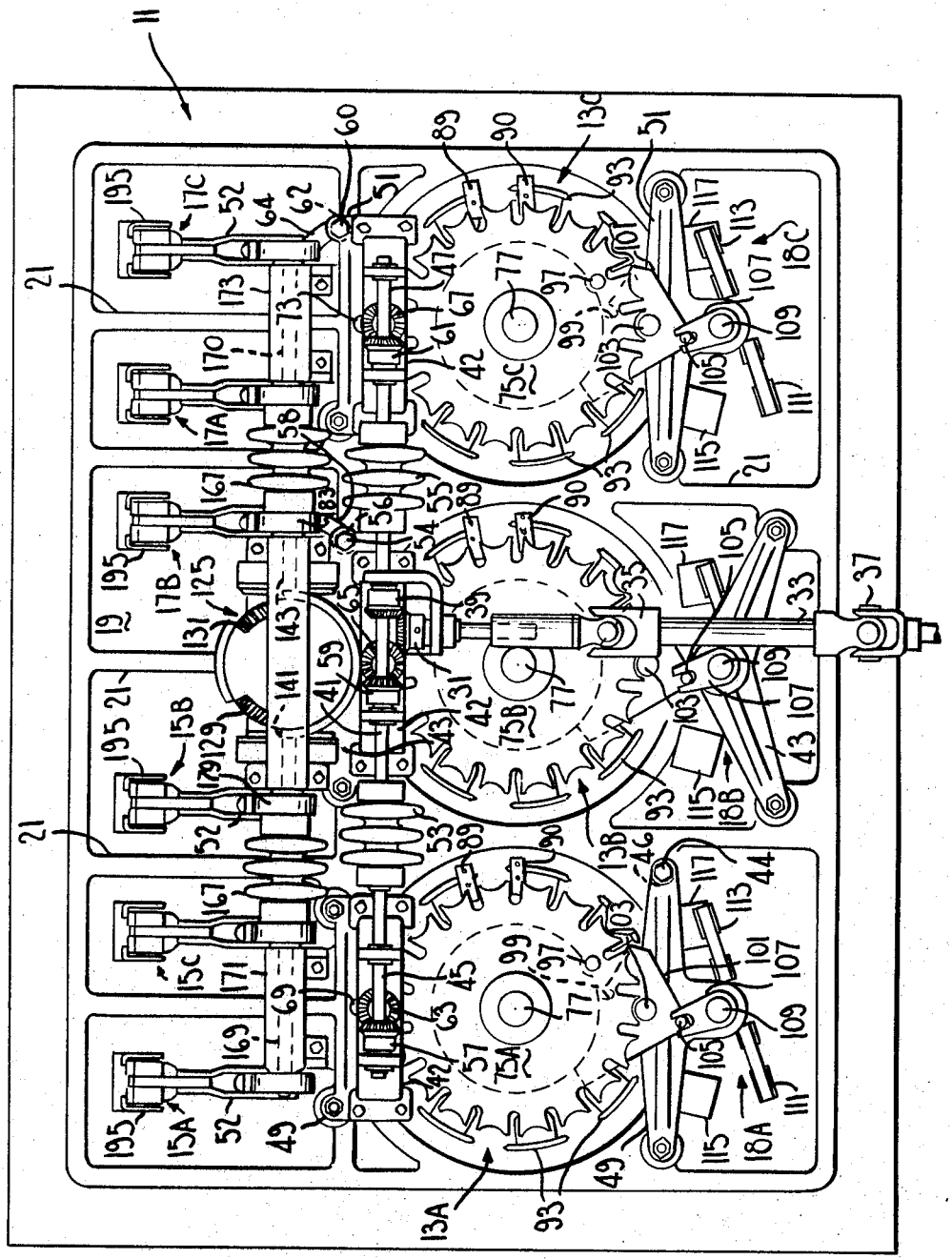
FIG. 1 is a front view of load tap changing apparatus of this invention.
Figure 2:
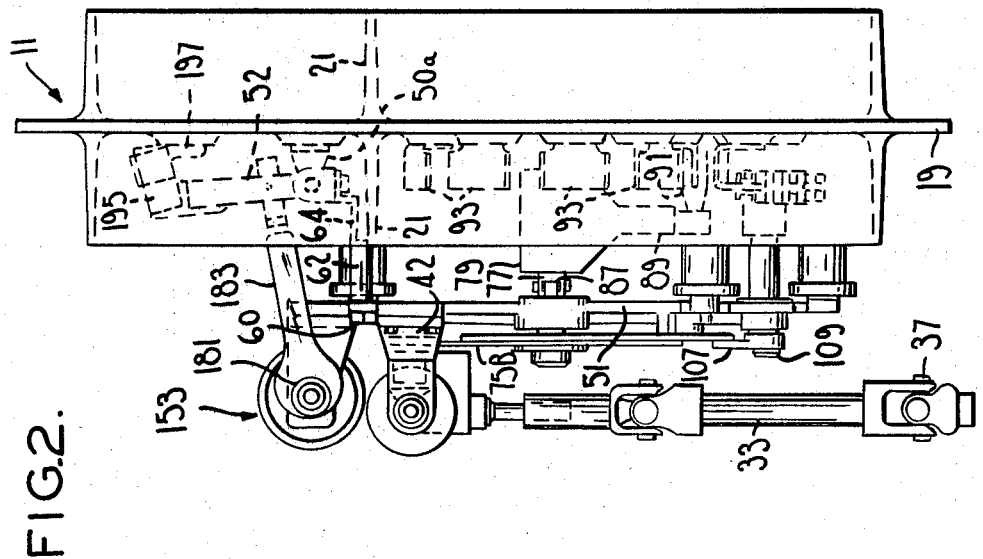
FIG. 2 is a side view of the apparatus of FIG. 1.
Figure 3:
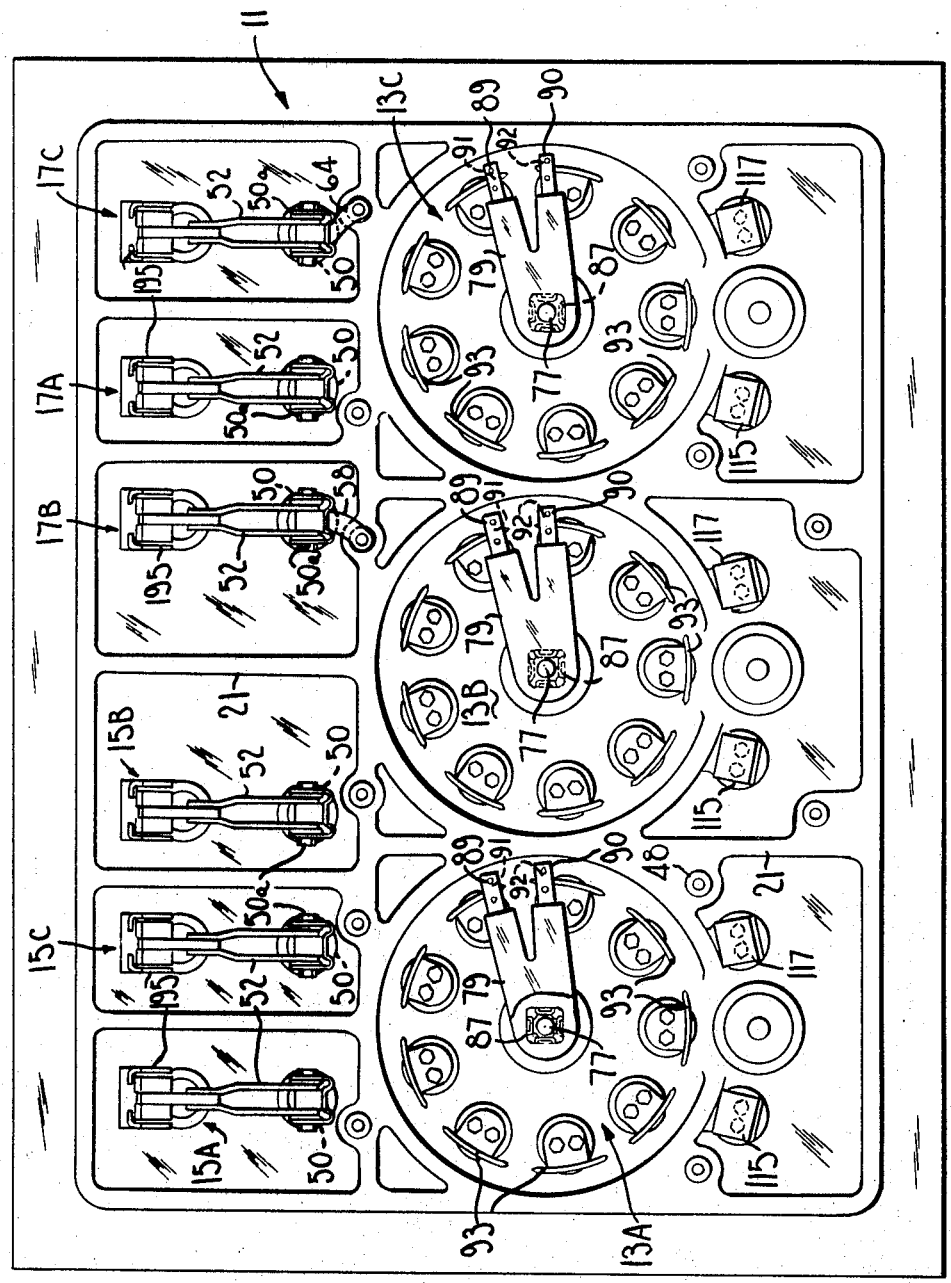
FIG. 3 is a front view with parts removed to show the disposition of the various contacts.

Referring now more particularly to FIGS. 1, 2 and 3, there is indicated at 11 an insulating bulkhead which constitutes a base upon which the tap changing apparatus illustrated is supported. The tap changing apparatus is arranged for handling three phase power and each phase includes a rotary tap changing switch, 13A, 13B and 13C respectively, a first load transfer switch 15A, 15B and 15C respectively, a second load transfer switch, 17A, 17B and 17C respectively, and a reversing switch, 18A, 18B and 18C respectively. Bulkhead 11 is cast from a dimensionally stable insulating material such as an epoxy resin of high insulating and excellent track resistance characteristics. In addition to a generally planar panel as indicated at 19, bulkhead 11 comprises a plurality of integral ribs 21 which both stiffen the bulkhead structure and define individual compartments for the different switches noted above. Bulkhead 11 includes a similar plurality of ribs on the back face of bulkhead panel 19 so that an essentially symmetrical rigid structure is obtained having no unbalanced curing stresses which might cause deformation during curing of the resin material.

Figure 7:
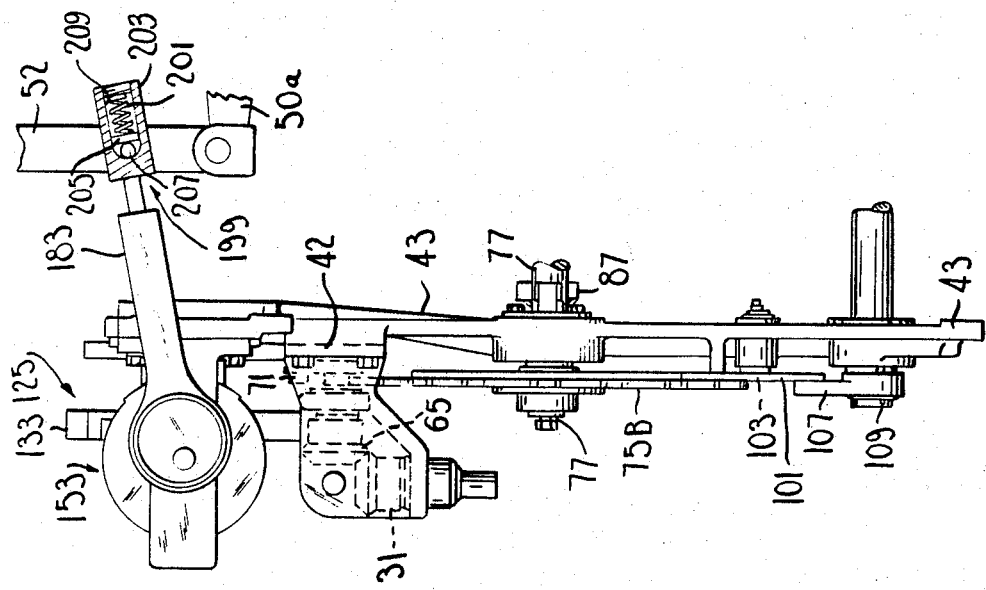
FIG. 7 is a view substantially on line 7—7 of FIG. 6.
Figure 6:
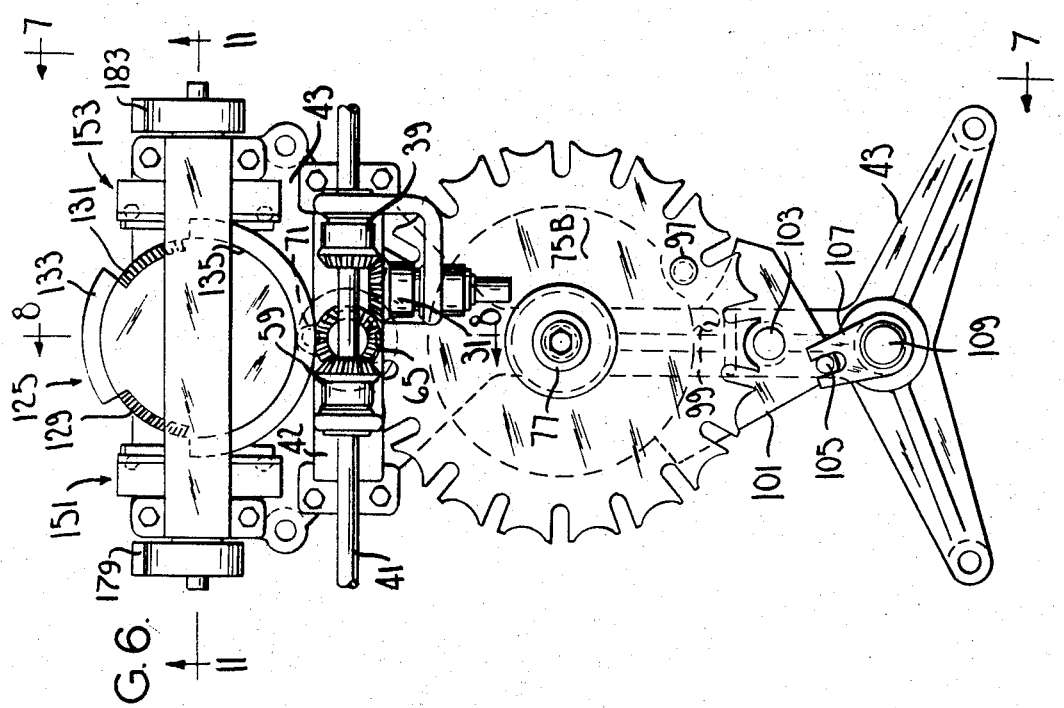
FIG. 6 is a front view, to larger scale than FIG. 1 showing portions of the drive and intermittent motion mechanism employed in this apparatus.

Driving force for effecting tap changing is applied to a bevel gear 31 by an input shaft 33 which includes a pair of universal joints 35 and 37 for accommodating any misalignment between the driving mechanism and gear 31. Bevel gear 31 drives a similar gear 39 which in turn rotates a shaft 41. Shaft 41 is journalled in a bracket 42 secured to a frame 43 and is thus supported in substantial alignment with a pair of shafts 45 and 47 which are similarly journalled in brackets 42 affixed to frames 49 and 51. Shaft 41 is coupled to shafts 45 and 47 through insulating couplings 53 and 55 respectively so that all three shafts rotate together. Mounted on each of the shafts 41, 45 and 47 is a bevel gear 57, 59 and 61 respectively. Gears 57, 59 and 61 drive meshing bevel gears 63, 65 and 67 which (see FIGS. 6–8) are coupled to Geneva driving pinions 69, 71 and 73 respectively. Geneva pinions 69, 71 and 73 drive respective Geneva gears 75A, 75B and 75C. Each of the Geneva gears 75A, 75B and 75C is mounted on one axle or end shaft 77 of a respective hub 79 (see FIGS. 2 and 13). The one end shaft 77 of each hub 79 is journalled in the respective frame 43, 49 or 51 and the end shaft 81 at the opposite end of the hub is journalled in a bearing 83 which is cast into bulkhead 11 and which includes a terminal 85 extending through the bulk head. A low resistance electrical contact between each of the bearing surfaces and the respective shaft is established by conductive brushes 87.

Each of the hub 79 comprises a first contact arm 89 and a second contact arm 90. (See also FIG. 3). As is explained in greater detail hereinafter, each of the arms 89 and 90 carries a movable contact, 91 and 92 respectively. As may be seen in FIGS. 3 and 13, contacts 91 and 92 are connected within hub 79 to respective ones of the hub shafts 77 and 81. Each of the frames 43, 49 and 51 constitutes a major portion of a conductive path between the respective movable contacts 91 (via end shafts 77) and the load transfer switches 17B, 17A and 17C. The circuit between frame 49 and load transfer switch 17A is completed through a bolt 44, metallic spacer 46, a feed through terminal 48 (FIGS. 1 and 3) cast in insulating bulkhead 11, and thence by means of a conductive cable (not shown) routed in back of panel 19 to another feedthrough terminal 50 (FIG. 3) to which is secured a fitting 50a on which is pivotally mounted a blade member 52 of load transfer switch 17A. The circuit is completed between frame 43 and load transfer switch 17B by means of a bolt 54, a metallic spacer 56 and a heavy formed copper shunt strap 58 (FIG. 3) to another fitting 50a on which is pivotally mounted blade 52 of load transfer switch 17B. Similarly, frame 51 is interconnected by a bolt 60, a spacer 62 and a shunt strap 64 to fitting 50a of load transfer switch 17C (FIGS. 1–3). Each of these terminals is cast into the bulkhead panel 19. Each of the contacts 92 (via end shafts 81 and feed-through terminals 85) is connected by a conductive cable to respective terminals 50 of load transfer switches 15A, 15B and 15C.

Each of the rotary tap changing switches also includes a multiplicity of fixed blade contacts 93 mounted on terminals 95 which are cast in and extend through the bulkhead. The movable contacts 91 and 92 carried by the contact arms 89 and 90 wipe on the inner and outer surfaces of the stationary contact blades 93. Arms 89 and 90 are angularly disposed so that the hub may be positioned either with both of the contacts 91 and 92 in engagement with a single one of the blade contacts 93 or with the two contacts being on different ones of the stationary contacts as illustrated in FIG. 1. The blade contacts 93 are of a width corresponding to the separation of the contacts on arms 89 and 90 so that one fixed contact can be engaged by both of the respective movable contacts.

The characteristics of the geneva wheels 75A, 75B and 75C are such that the angular increment of movement of the wheel during one revolution of the respective geneva pinions 69, 71 and 73 is equal to one half of the angle between adjacent fixed contacts 93, and the angular positions of the geneva gears and of the hubs 79 are related so that the pauses in the rotation of the geneva mechanism occur when the movable contacts are either both on the same fixed contact or when they are fully on adjacent contacts as illustrated in FIGS. 1 and 3.

Each of the geneva gears 75A, 75B and 75C carries a pin 97 for operating the respective reversing switch 18A, 18B or 18C. As the geneva gear rotates, pin 97 engages a slot 99 in a respective operating plate 101 which is pivotably mounted, as indicated at 103, on the respective frame. Each of the plates 101 carries a pin 105 which fits within a respective reversing switch operating fork 107. Each of the operating forks 107 is mounted on a respective shaft 109 journalled in the respective frame. The shafts 109 each carry a pair of reversing switch contact arms 111 and 113. Associated with each of the arms 111 and 113 is a respective fixed contact 115 and 117. The arms are arranged so that when one set of contacts is open the other is closed. As is explained in greater detail hereinafter, contacts 115, 117 and contact arms 111 and 113 are interconnected as a reversing switch to change the voltages applied to the tap changing switches 13a, 13b and 13c from a boost to a bucking relationship with regard to the main voltage component which is to be adjusted.

The bevel gear 65 which drives the geneva pinion 71 for the center tap changing switch 13B also drives a spur gear pinion 121. (See FIG. 8). Pinion 121 drives a gear 123 which in turn powers an intermittent motion mechanism indicated generally at 125. Gear 123 is twice the size of pinion 121 so that it turns just half as many turns. Intermittent motion mechanism 125 includes an intermittent or sector bevel gear 127 which is attached to and rotates with spur gear 123. Sector gear 127 includes teeth at spaced sectors 129 and 131 around its periphery (see FIG. 6). Each of the sectors occupies approximately 60° of the available periphery and the two toothed sectors are separated by a sector of about 60°, leaving a remaining untoothed portion of the periphery of about 180°. The untoothed portions of the periphery of gear 127 include a locking rim as indicated at 133 and 135, the operation of which is described in greater detail hereinafter.

The toothed sectors 129 and 131 drive a pair of bevel gear pinions 137 and 139 (see FIG. 11) which are journalled on respective opposed shafts 141 and 143, that is, the pinions are free to turn on the shafts. The diameter of each of the bevel pinion gears 137 and 139 is chosen in relation to the length of sectors 129 and 131 so that each sector in passing will rotate the pinion gear 180°. Each of the pinions 137 and 139 includes a hub 145 which, as illustrated in FIG. 12, includes at least two flatted surfaces 147 and 149. When the teeth of the pinion are not being driven by the toothed sectors of the driving gear 127, these flat surfaces are engaged by one or the other of locking rims 133 and 135 to lock the pinions and prevent further rotation thereof.

Bevel pinions 137 and 139 drive respective identical accelerating mechanisms indicated generally at 151 and 153. (See FIGS. 4, 5 and 11.) Each of the accelerating mechanisms 151 and 153 includes a hub 155 and a cam plate 157 which are attached to and rotate with the respective pinion gear 137 or 139.

Each of the hubs 155 is coupled to a respective cup-like member 159 by a plurality of radially extending tension springs 161. Each of the members 159 is pinned to the respective shaft 141 or 143 as indicated at 163 in FIG. 11 for rotation therewith.

Figure 9:
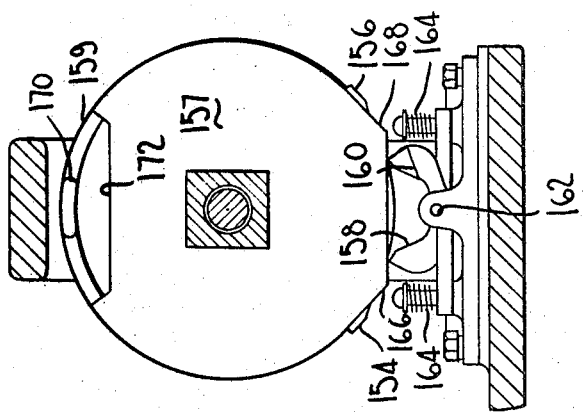

Each of the cup-shaped members 159 includes a pair of projections constituting a pair of opposed sear surfaces as indicated at 154 and 156 in FIG. 4. As may be seen in FIGS. 9 and 10, a pair of triggers 158 and 160 are mounted on a pivot 162 adjacent each of the accelerator mechanisms for engaging respective ones of the sears 154 and 156. The triggers are resiliently urged into position for engaging the sears by springs 164. Each of the cam plates 157 includes a pair of projections 166 and 168 which are operative to drive a trigger out of engagement with the respective sear as described hereinafter.

Figure 10:
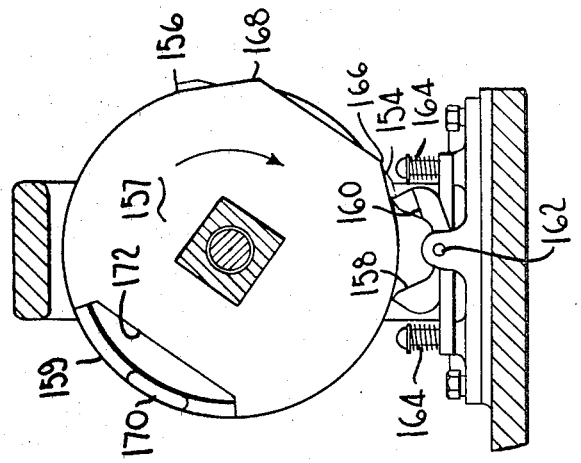
FIGS. 9 and 10 illustrate the operation of the accelerator illustrated in FIGS. 4. and 5.

As illustrated in FIG. 10, when the accelerator assembly is rotated by the respective bevel pinions so that the sear 154 is caught by trigger 160, the cup-shaped member 159 will be held back while the cam plate 157 continues to rotate, the relative angular displacement between these two members causing an extension of the radial springs 161. When a preselected relative angular displacement has been built up, the projection 166 on cam plate 157 will release trigger 160 allowing the cup-shaped member 159 to abruptly catch up with the cam plate 157 under the force provided by springs 161. These abrupt or accelerated movements are timed to coincide with the opening or closing of the various load transfer switches for providing a very rapid opening of closing of the contacts. As protection against spring breakage, relative angular displacement between the cup-shaped member 159 and the cam disc 157 is absolutely limited by a tab 170 on the cup member 159 which extends into an oversized notch 172 cut into the cam plate 157.

As may be seen in FIG. 1, each of the shafts 141 and 143 is connected, through an insulating coupling 167 to a respective shaft 169 or 170 which is axially aligned therewith and which is journalled in a respective frame 171 or 173. Shafts 141 and 169 carry eccentrics 177 (FIG. 11) which operate the first load transfer switches 15A, 15B and 15C through respective insulating connecting rods 179. Shafts 143 and 170 carry eccentrics 181 for operating the second load transfer switches 17A, 17B and 17C through respective insulating connecting rods 183. (See FIGS. 2, 7 and 11).

Each of the load transfer switches 15A, 15B and 15C, 17A, 17B and 17C includes blade member 52 each of which, as described previously, is pivotally mounted on a respective fitting 50a secured to terminal 50 cast in bulkhead panel 19, which fittings and terminals are connected to respective switch contacts 91 and 92 as described above. By operation of the respective eccentric, each of the blades 52 may be moved into or out of engagement with a respective socket contact 195 which is similarly mounted on a feed-through terminal 197 (FIG. 2). To further accelerate the opening of the load transfer switches each of the connecting rods 183 is coupled to the respective blade member 52 by means of a spring mechanism as indicated generally at 199 in FIG. 7. A coil compression spring 201 is mounted within a sleeve 203 on the end of each connecting rod 183 and urges a follower 205 against a pin 207 set into the respective switch blade member 52, the pin being free to slide lengthwise of sleeve 203 in a slot 209. When the respective eccentric turns to open the load transfer switch; the spring 201 is compressed until the blade member 52 is pulled out of the fixed contact 195. The spring 201 then expands thereby rapidly opening the contacts and minimizing arcing. On closing, the sleeve 203 bears directly on pin 207 and the spring 201 does not affect the closing operation.

Figure 14:
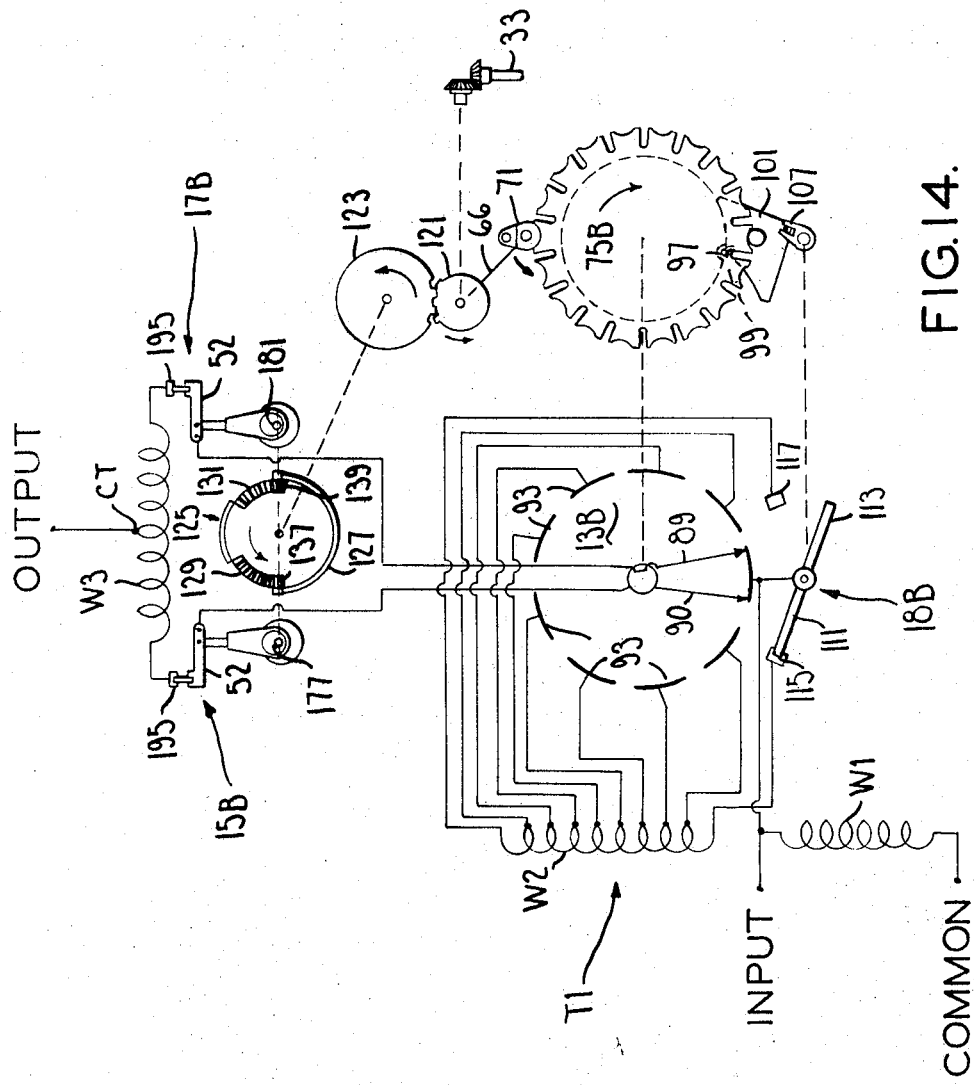
FIG. 14 is a partially schematic circuit diagram of the interconnection of one phase of the tap changing apparatus of FIG. 1 with a tapped transformer winding and a tap bridging inductor.

The operation of the apparatus illustrated in conjunction with a tapped transformer winding to produce voltage adjustments may be understood with reference to FIG. 14, only the B phase being illustrated. There is indicated at T1 a transformer having a primary winding W1 and a tapped secondary winding W2 which may be interconnected with winding W1 to buck or boost the A.C. voltage appearing across that winding. It should also be understood that winding W1 may itself comprise the secondary winding of a power transformer with the winding W2 being employed as an auxiliary winding for adjusting the voltage provided by winding W1. To permit taps to be changed while the windings W2 and W1 are under load, there is provided an impedance or inductor having a winding W3 which is divided into a pair of winding as impedance sections by a center tap CT.

One end of winding W1 constitutes the common terminal for both the unadjusted and adjusted voltages. The other end of winding W1 forms the input terminal for power at the unadjusted voltage. This end of winding W1 is connected to the arms 111 and 113 of the reversing switch 18B and to the bottom one of the fixed contacts 93 of the rotary tap changing switch 13B. The end terminals of the secondary winding W2 are connected to the fixed contacts 115 and 117 of the reversing switch 18B and the remaining intermediate taps of winding W2 are connected to respective ones of the remaining fixed contacts 93 of the rotary tap changing switch 13B. The end terminals of inductor winding W3 are connected to the fixed contacts 195 of the respective first and second load transfer switches 15B and 17B. The movable contacts 52 of the load transfer switches 15B and 17B are connected to the movable contact arms 89 and 90 of the rotary tap changing switch 13B through the end shafts of the hub as described previously.

With both of the contacts 89 and 90 on the bottom one of the fixed contacts 93 as illustrated, the input voltage is applied equally to both sections of the inductor winding W3 and thus the output voltage will equal the input voltage. By rotating the input shaft 33 so that pinion 121 is rotated approximately 120° and gear 123 is rotated 60°, the toothed sector 129 is swung past the bevel pinion 137 thereby rotating eccentric 177 by 180° to open the first load transfer switch 15B. This operation is accelerated by the accelerator mechanisms 151 illustrated in FIGS. 4, 5, 9 and 10 as described previously and also by the connecting rod spring mechanism 199 shown in FIG. 7. The load current flowing through the movable contact arm 90 of the rotary tap changing switch is thus cut off and the entire load current flows through the contact arm 89 and the right hand section of inductor winding W3. During this first 120° rotation of pinion 121, geneva gear 75B is not rotated by its pinion 71.

During the next 120° rotation of pinion 121, the two bevel gear pinions 137 and 139 are kept from rotating by the locking rims on intermittent gear 127 but the Geneva pinion 71 causes the Geneva gear 75B to advance one step or increment. This movement of Geneva gear 75B causes the contact arms 89 and 90 of the rotary tap changing switch to move from the position illustrated where both of the contact arms are in contact with the same (bottom) fixed contact 93 to a position in which the arm 90 has moved to an adjacent one of the contacts 93 so that the two contact arms are connected to different taps on winding W2. At this point the load current still flows through only one side of inductor W3 however.

During the third 120° rotation of pinion 121, the Geneva gearing remains still while the other toothed sector (131) of intermittent gear 127 swings past bevel pinion 137 causing it to rotate eccentric 177 to close load transfer switch 15B. At this point in the operation the inductor winding W3 is connected across two adjacent terminals on the tapped secondary winding W2 and is thus effective to divide the difference between the voltages present at those two taps so that a voltage intermediate the two voltages is provided at the output terminal.

The operations thus far described, which are produced by a full revolution of pinion 121, may conveniently be considered as constituting a half step of voltage adjustment. In some applications it may be desirable that the apparatus be maintained in this state for appreciable periods of time to provide as fine a gradation of adjustment as is possible. In other modes of operation, however, it may be desirable that the apparatus be always operated in full steps or cycles so that inductor winding W3 is not left bridging a pair of different voltage taps on a continuous basis. The completion of a full step of adjustment is provided by a second revolution of pinion 121 as follows. During the first 120° of a second revolution of pinion 121, toothed sector 129 will cause bevel gear pinion 139 to rotate eccentric 181 so as to open the second load transfer switch 17B. The opening of switch 17B will isolate the contact arm 89 of the rotary tap changing switch 13b and the entire load current will then flow through the left-hand section of inductor winding W3 and contact arm 90.

During the next 120° rotation of pinion 121, the Geneva pinion 71 will rotate the Geneva gear 75B to advance the contact arms 89 and 90 so that both contact arms are again on the same fixed contact 93, this new contact 93 being adjacent (to the left) the contact with which both arms were in engagement at the start of the operation being explained. The third 120° of rotation of pinion 121 in its second revolution will swing the toothed sector 131 past bevel pinion 139 thereby closing load transfer switch 17B so that both sides of the inductor winding W3 are connected to this new contact 93.

It can thus be seen that continued rotation of input shaft 33 and timing shaft 66 will cause the contact arms 89 and 90 to be advanced step-wise around the fixed contact 93 so that progressively increasing voltages are supplied to the output, each contact arm 89 or 90 being disconnected from the load circuit before it leaves one of the fixed contacts 93 and being reconnected in the load circuit only after it engages another one of the fixed contacts.

Similarly, if input shaft 33 is turned so that the pinion 121 is rotated continuously in the opposite direction the contact arms 89 and 90 will move around the fixed contacts 93 step-wise in the opposite direction so that progressively decreasing voltages are supplied to the output terminal. If the contact arms 89 and 90 are driven in this opposite direction beyond the position initially described, that is, with both contact arms being in engagement with the bottom fixed contact 93, the pin 97 will engage the slot 99 in plate 101 thereby operating the reversing switch 18B to connect tapped winding W2 in a voltage bucking relationship with winding W1. Rotation of the contact arms 89 and 90 past the bottom contact 93 in this opposite direction will then continue to cause the output voltage to decrease step-wise in conventional manner.

As the rotary tap changing switches, the load transfer switches and the reversing switches are all mounted on a common, generally planar bulkhead and since the switch contacts are mounted either directly on terminals, usually of the feed-through type, cast into the bulkhead or are connected directly to such terminals through framework members, it is seen that all the conductive cables for interconnecting the switches and the transformer and inductor windings are located on the back side of bulkhead 11 and in the transformer. As contrasted with other forms of tap changing apparatus, as for example those in which the several rotary tap changing switches are mounted on a common shaft, the present apparatus may be wired quite simply without any need for snaking cables around the switching mechanisms, and thereby effectively saving substantial labor costs.

Figure 15:
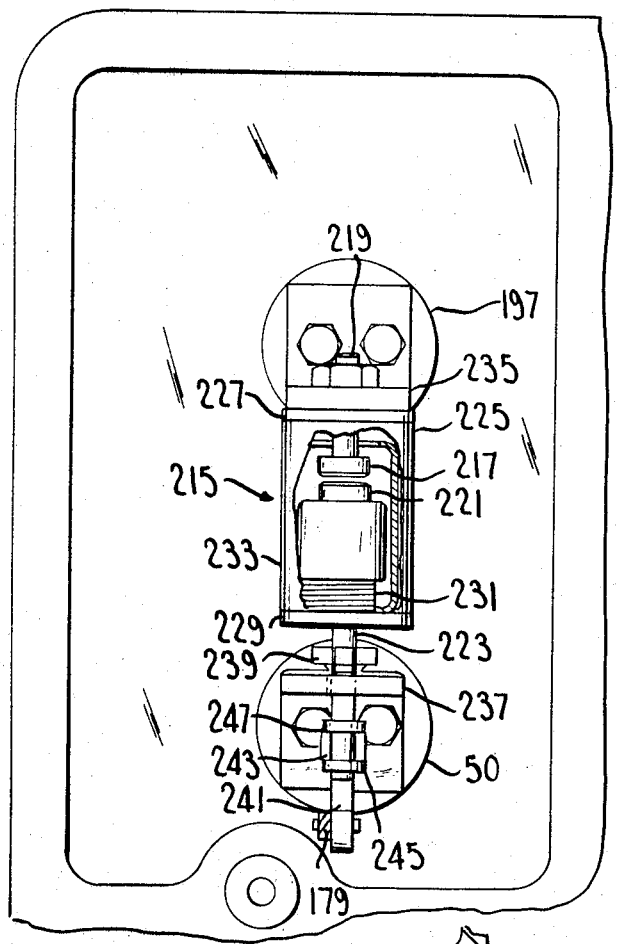
FIG. 15 is a plan view of a modification employing a vacuum switch in place of the load transfer switch shown in FIG. 1.
Figure 16:
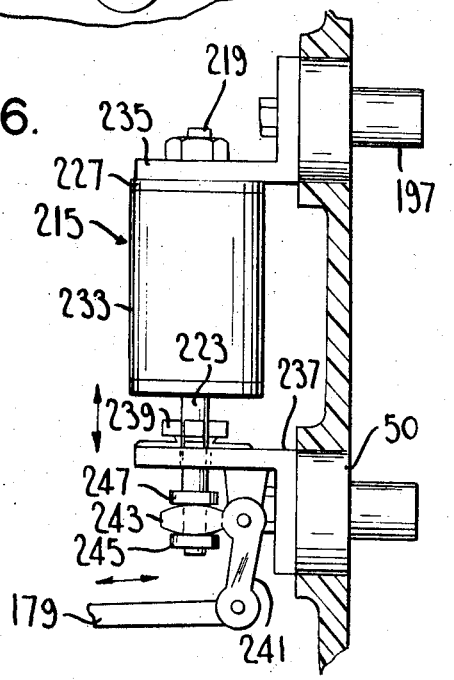
FIG. 16 is a side view of the vacuum switch mechanism of FIG. 15.

In the embodiment shown in FIG. 15 the load transfer switching function is performed by a vacuum switch or interrupter as indicated generally at 215. The vacuum interrupter includes a fixed contact 217 mounted on a stud 219 and a movable contact 221 mounted on a shaft 223. The contacts are supported within a sealed vessel as indicated generally at 225 which includes one metallic end cap 227 to which stud 219 is sealed and an end cap 229 through which shaft 223 is free to slide and to which contact 221 is flexibly sealed by a bellows assembly 231. The vessel is completed by a ceramic tube 233 which extends between the end caps 227 and 229 and which is hermetically bonded thereto. Stud 219 is connected to feed-through terminal 197 by means of an L bracket 235 and shaft 223 is journalled through a similar bracket 237 mounted on feed-through terminal 50, electrical sliding contact being established by brushes 239.

Vacuum interrupter 215 is operated by connecting rod 179 operating through a bell crank 241 mounted on bracket 237. Bell crank 241 includes an arm 243 having curved sides which bear against a pair of shoulders 245 and 247 on shaft 223.

The contacts 217 and 221, being sealed in an evacuated environment, are capable of breaking a relatively large current with a relatively small contact travel and thus the offset of the eccentric 177 which operates connecting rod 169 may be correspondingly reduced. While a vacuum interrupter has been illustrated it should be understood that other types of sealed, enclosed switches may be employed, for example, those in which the contacts are mounted in an environment of a nonionizing inert fluid or gas.

It will be understood that the input shaft 33 is driven by a motor drive unit (not shown) the actuation thereof in one direction or another being responsive to any conventional automatic control unit which senses a drop or rise in the line voltage by the customary potential and current transformers, and actuates the load tap changing apparatus described above until the voltage buck or boost supplied brings the line voltage back to the desired level.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for changing voltage tap connections under load, said apparatus comprising:
   a winding having a plurality of taps at which different voltages are provided;
   a rotary tap changing switch including a multiplicity of fixed contacts connected to respective ones of said taps and disposed in a circular pattern, said switch including also a pair of rotatable contacts mounted on a common hub for movement into and out of engagement with selected ones of said fixed contacts, said hub having a first plurality of positions in which both of said pairs of rotatable contacts are in engagement with one of said fixed contacts and a second plurality of positions in which said rotatable contacts engage adjacent fixed contacts;
   an inductor for bridging a pair of said taps, said inductor including one winding section for connecting one of said taps to a load through one of said rotatable contacts and another winding section for connecting another one of said taps to said load through the other of said rotatable contacts;

a first load transfer switch for selectively disconnecting one of said sections from the load;

a first rotary shaft which operates said first load transfer switch;

a second load transfer switch for selectively disconnecting the other of said sections from the load;

a second rotary shaft which operates said second load transfer switch;

an intermittent motion drive for rotating said shafts, said drive including a relatively large driving gear and a pair of smaller pinion gears for driving respective ones of said shafts, said driving gear having teeth at spaced sectors around its periphery for opening and closing said first load transfer switch during one portion of its rotation and for opening and closing said second load transfer switch during another portion of its rotation, one of said load transfer switches being closed at all times; and means for rotating said driving gear in predetermined sequential relation to the rotation of said rotatable contacts whereby, as taps are changed, each of said inductor winding sections is disconnected from the load before the respective rotatable contact is moved out of engagement with one of said fixed contacts and is reconnected only after the rotatable contact engages another one of said fixed contacts.

2. Apparatus as set forth in claim 1 in which said intermittent motion drive includes resilient energy storage means for accelerating the opening and closing of said load transfer switches.

3. Apparatus as set forth in claim 2 including a pawl for retarding operation of each of said load transfer switches until appreciable energy is stored in said storage means and then releasing said energy.

4. Apparatus as set forth in claim 1 including resilient energy storage coupling means for connecting each of said pinion gears to a respective one of said shafts for accelerating the opening and closing of said load transfer switches.

5. Apparatus as set forth in claim 4 wherein each of said coupling means includes a pawl for retarding movement of the respective shaft and means responsive to movement of the respective pinion gear through a preselected angle for releasing said pawl and thereby applying energy stored in said coupling means to the respective shaft to rapidly operate the respective load transfer switch.

6. Apparatus as set forth in claim 5 wherein each of said shafts carries an eccentric for operating the respective load transfer switch and said eccentric is coupled to the respective switch through a connecting rod.

7. Apparatus as set forthin claim 6 wherein each of said connecting rods includes spring means for storing energy during opening of the respective load transfer switch, which energy is released to speed the opening of the load transfer switch contacts.

8. Apparatus as set forth in claim 6 wherein said load transfer switches are sealed vacuum switches.

9. Apparatus as set worth in claim 1 wherein said shafts are axially aligned and said driving and pinion gears are bevel gears.

10. Apparatus as set forth in claim 9 wherein said pinion gears have a hub including at least a pair of substantially flat locking surfaces and said driving gear includes a rim, extending along portions of its periphery which do not include teeth, for engaging said flat surfaces thereby to lock said pinions in fixed position when not being driven by said driving gear.

11. Apparatus as set forth in claim 10 including a plurality of similar tap changing switches disposed linearly in a common plane and a first and second load transfer switch for each of said tap changing switches, said first load transfer switches being disposed in a row for operation by aid first shaft and said second load transfer switches being disposed in a row for operation by said second shaft.

12. Apparatus for changing voltage tap connections under load, said apparatus comprising:

a plurality of different phase windings each having a plurality of taps at which different voltages are provided, said windings being located in a compartment;

an insulating bulkhead for said compartment cast of a stable insulating resin material as an integral assembly;

a rotary tap changing switch for each phase positioned on the side of said bulkhead opposite said windings, each switch including a multiplicity of fixed contacts mounted on feed-through terminals which are cast in said bulkhead and are connected within said compartment to respective ones of said taps by conductive cables, said fixed contacts being disposed in a circular pattern, each said switch including also a pair of rotatable contacts mounted on a common hub for movement into and out of engagement with selected ones of said fixed contacts, each of said rotatable contacts being connected to a respective end of its hub, each hub having a first plurality of positions in which both of the respective pairs of rotatable contacts are in engagement with one of said fixed contacts and a second plurality of positions in which separate ones of said contacts engage adjacent fixed contacts;

journal means respectively supporting and electrically interconnecting the end of each of said hubs nearest said bulkhead, said journal means constituting second feed-through terminals cast in said bulkhead;

second journal means respectively supporting and electrically interconnecting the other end of each of said hubs to third terminals cast in said bulkhead;

an inductor within said compartment for each phase for bridging a pair of said taps on a respective phase winding during tap changing, each inductor including one winding section for connecting one of said taps to a load through a respective one of said rotatable contacts and another winding section for connecting another one of said taps to said load through the other respective one of said rotatable contacts;

a first load transfer switch for each phase for selectively disconnecting one of the respective sections from the load;

a first shaft journalled in a plane parallel to said bulkhead;

means responsive to rotation of said first shaft for operating each of said first load transfer switches;

a second load transfer switch for each phase for selectively disconnecting the other of the respective sections from the load;

a second shaft journalled in said plane;

means responsive to rotation of said second shaft for operating each of said second load transfer switches, each of said first and second load transfer switches being mounted on the side of said bulkhead opposite said windings and including a fixed contact which is mounted on a fourth feed-through terminal cast in said bulkhead and a movable contact which is continuously interconnected through structural support members to a fifth terminal cast in said bulkhead;

an intermittent movement mechanism for rotating said shafts for opening and closing said first load transfer switches during one portion of the operation of said mechanism and for opening and closing said second load transfer switches during another portion of this operation, at least one of said first or second load transfer switches being closed at all times;

means for rotating said rotatable contacts in unison; and means for operating said intermittent movement mechanism in predetermined sequence relative to the rotation of said rotatable contacts, said bulkhead having a plurality of projecting ribs which stiffen said bulkhead and insulate from each other those components which are at different electrical potentials; all conductive cables for interconnecting said tap changing switches with said load transfer switches, said winding sections and said taps being located within said compartment.

13. Apparatus as set forth in claim 12 wherein each of said load transfer switches comprises a fixed contact mounted on a feed-through terminal cast in said bulkhead and a blade pivotally mounted on another feed-through terminal cast in said bulkhead for movement into and out of engagement with said fixed contact in a plane perpendicular to said bulkhead.

14. Apparatus as set forth in claim 13 wherein the means for operating each of said load transfer switches includes an eccentric on the respective said shaft.

15. Apparatus as set forth in claim 14 wherein each of said tap changing and load transfer switches is disposed in a respective individual pocket formed in said bulkhead by said ribs.

16. Apparatus as set forth in claim 12 wherein said bulkhead includes similar ribs on both sides, the ribs on the side of said bulkhead opposite said rotary tap changing switches forming pockets for separating said interconnecting conductive cables.

17. Apparatus for changing voltage tap connections under load, said apparatus comprising:

a winding having a plurality of taps at which different voltages are provided, said winding being located in a compartment;

an insulating bulkhead for said compartment cast of a stable insulating resin material as an integral assembly;

a rotary tap changing switch positioned on the side of said bulkhead opposite said winding, said switch including a multiplicity of fixed contacts mounted on feed-through terminals which are cast in said bulkhead and are connected within said compartment to respective ones of said taps by conductive cables, said fixed contacts being disposed in a circular pattern, each said switch including also a pair of rotatable contacts mounted on respective rotatable contact arms for movement about a common axis into and out of engagement with selected ones of said fixed contacts, said contact arms having a first plurality of positions in which both rotatable contacts are in engagement with one of said fixed contacts and a second plurality of positions in which said contacts engage adjacent fixed contacts;

means respectively supporting and respectively electrically interconnecting the contact arms, said means including second and third terminals cast in said bulkhead;

an impedance within said compartment for bridging a pair of said taps during tap changing, said impedance including one impedance section for connecting one of said taps to a load through a respective one of said rotatable contacts and another impedance section for connecting another one of said taps to said load through the other respective one of said rotatable contacts;

a first load transfer switch means for selectively disconnecting one of the respective sections from the load;

means for operating said first load transfer switch means;

a second load transfer switch means for selectively disconnecting the other of the respective sections from the load;

means for operating said second load transfer switch means, each of said first and second load transfer switch means being mounted on the side of said bulkhead opposite said winding and including fourth and fifth terminals cast in said bulkhead;

an intermittent movement mechanism for opening and closing said first load transfer switch means during one portion of the operation of said mechanism and for opening and closing said second load transfer switch means during another portion of this operation, at least one of said first or said second load transfer switch means being closed at all times;

means for rotating said contact arms to move said rotatable contacts sequentially into engagement with any selected fixed contact; and means for operating said intermittent movement mechanism in predetermined sequence relative to the rotation of said rotatable contacts, said bulkhead having a plurality of projecting ribs which stiffen said bulkhead and insulate from each other those components which are at different electrical potentials; all of the aforesaid components other than said winding and said impedance being mounted on and supported by said insulating bulkhead; all conductive cables for interconnecting said tap changing switch with said taps and for interconnecting said load transfer switch means with said impedance sections being located within said compartment.

18. Apparatus as set forth in claim 17 wherein there are a plurality of different windings of different phases and there is a rotary tap changing switch, an impedance and load transfer switch means for each phase.

19. Apparatus as set forth in claim 18 wherein the load transfer switch means include at least one vacuum interrupter per phase.

References Cited

UNITED STATES PATENTS

| 2,693,573 | 11/1954 | Perkins | 323—43.5 |
| 2,709,777 | 5/1955 | Willis et al. | 323—43.5 |
| 3,045,173 | 7/1962 | Wilson | 323—43.5 |
| 3,365,655 | 1/1968 | Simpson et al. | 323—43.5 |

JOHN F. COUCH, *Primary Examiner.*

G. GOLDBERG, *Assistant Examiner.*

U.S. Cl. X.R.

200—175; 323—47